(12) United States Patent
O'Connor

(10) Patent No.: US 10,207,241 B2
(45) Date of Patent: Feb. 19, 2019

(54) INDUCTIVELY HEATED MICROCHANNEL REACTOR

(71) Applicant: Kontak LLC, Redmond, WA (US)

(72) Inventor: David O'Connor, North Bend, WA (US)

(73) Assignee: KONTAK LLC, Redmond, WA (US)

( * ) Notice: Subject to any disclaimer, the term of this patent is extended or adjusted under 35 U.S.C. 154(b) by 0 days.

(21) Appl. No.: 15/826,590

(22) Filed: Nov. 29, 2017

(65) Prior Publication Data

US 2018/0290122 A1    Oct. 11, 2018

Related U.S. Application Data

(60) Provisional application No. 62/427,272, filed on Nov. 29, 2016.

(51) Int. Cl.
*H01M 2/00* (2006.01)
*B01J 19/00* (2006.01)
*B01J 23/75* (2006.01)
*H01M 8/0612* (2016.01)

(52) U.S. Cl.
CPC ........... *B01J 19/0093* (2013.01); *B01J 23/75* (2013.01); *H01M 8/0618* (2013.01); *B01J 2219/00822* (2013.01); *B01J 2219/00835* (2013.01); *B01J 2219/00882* (2013.01)

(58) Field of Classification Search
CPC ....................................... H01M 2/00
USPC ....................................... 429/122
See application file for complete search history.

(56) References Cited

U.S. PATENT DOCUMENTS

2012/0236903 A1*  9/2012  Rejman ................. H02J 7/025
                                                            374/152

* cited by examiner

*Primary Examiner* — Jacob B Marks
(74) *Attorney, Agent, or Firm* — Perkins Coie LLP

(57) ABSTRACT

The current document is directed to an efficient multi-channel chemical reactor having a multichannel core containing a plurality of parallel channels, with conductive walls, having a varying composition along their lengths. The channels are heated by a frequency-addressing different regions within the reactor with an inductive coil, driven by an agile frequency or spread spectrum emission controller.

20 Claims, 12 Drawing Sheets

Hystersis loss

Energy is required to turn the small internal magnets around. This is like friction. The material becomes heated.

Larger Loss    Smaller Loss
Hysteresis loss depends on the area of the hysteresis loop in the material

INDUCTIVELY HEATED MICROCHANNEL REACTOR

CROSS REFERENCE TO RELATED APPLICATIONS

The present application is a non-provisional of, and claims benefit of priority from, U.S. Provisional Patent Application No. 62/427,272, filed Nov. 29, 2016, the entirety of which is expressly incorporated herein by reference.

TECHNICAL FIELD

The present invention relates to the field of catalytic chemical reactors, and in particular, to a multi-channel chemical reactor having a heterogeneous surface composition.

BACKGROUND OF THE INVENTION

Chemical reactions are commonly carried out in reactors in which molecules are forced to interact with heated catalysts to produce a desired chemical product or products. Precise heating of the catalyst is used to ensure that desired products are produced at desired yields, concentrations, and purities. When the temperature is too high, unwanted chemical reactions may occur. When the temperature is too low, the catalyst is generally insufficiently active to produce the desired product or products. The input reactant or reactants generally react to produce the desired product or products only when they are in intimate contact with the catalyst. Chemical reactors therefore feature tightly constrained spaces containing precisely-heated catalyst particles.

Known systems permit hydrogen storage and release using an organic hydrocarbon hydrogen carrier molecule, which releases hydrogen by the action of a catalyst and heat. To provide a large surface area, a core having parallel microchannels is employed, through which the organic hydrocarbon hydrogen carrier molecule flows, contacting catalytic surfaces of the microchannels.

Current designs are very inefficient because heat has to move from exterior heaters to channels deep within the core's interior. Heat moves from hot outer surfaces to the cooler inner surfaces via conduction along the thin channel walls. This requires that the heat on the outside channels be much higher than the desired heat on the inner channels. The heat differential is typically quite extreme, up to 100° C. or more. This range of temperatures may result in inefficient operation, and/or unintended or undesirable chemical decomposition.

A typical multi-channel reactor has a ceramic core with channels having square cross-sections measuring approximately 1 mm on a side, running parallel down the length of the core. The length of the core is chosen so that there is a high probability of reaction by the end of the microchannel. The number of channels is usually a function of flow rate and reaction rate and the expected portion of unreacted molecules at the exit of the channels. The number of channels can be from hundreds to thousands, in some designs.

For reactions that are endothermic, such as those carried out within an automobile catalytic converter, the engine heat is used to heat the channel surfaces before the final reaction occurs. However, not all catalytic converters are attached to a heat generating engine or heat source, and thus require external heat in order to maintain the catalyst within an appropriate range of temperatures.

Currently available reactors for this type of system have external heating elements attached to the outside housing of the cores. This type of design is very inefficient, since the heat has to move from the exterior heaters to the channels deep within the core interior. The core is typically designed for high surface area per volume or weight, and therefore the wall conduction of heat to the center of the core is poor. This makes the outside channels reach a higher temperature than the inner channels. The heat differential may be quite extreme, on the order of a 100 degrees Celsius or more. This extreme difference makes the channels on the outside too hot and creates the potential for unwanted side reactions of the organic hydrocarbon hydrogen carrier molecule.

Application of the catalyst to the side walls of the channels is also suboptimal in currently available chemical reactors. Currently, the practice is to dip the core into a slurry bath where the slurry consists of a suspension with a small percentage of catalyst with alumina and water with a viscosity like wheat paste. The alumina is used as the mechanism to bind the catalyst to the core channels. The problem with this technique is that the mixture is not homogeneous. It's hard to tell where the catalyst is within the mixture. Because the mixture is not homogeneous, some channels have no catalyst while others have too much.

Inductively heated catalytic systems are disclosed in, e.g.: 20170334822; 20170321233; 20170283258; 20170260328; 20170252872; 20170233546; 20170226907; 20170218823; 20170218816; 20170210892; 20170190629; 20170183477; 20170170477; 20170158840; 20170152532; 20170145886; 20170130252; 20170128927; 20170121737; 20170101528; 20170101312; 20170089304; 20170080697; 20170079325; 20170022868; 20170022062; 20170014765; 20170014764; 20170014763; 20170009061; 20170009060; 20170000145; 20160298147; 20160298141; 20160293990; 20160289710; 20160289709; 20160289706; 20160289705; 20160289704; 20160289577; 20160281482; 20160265159; 20160257783; 20160257067; 20160251535; 20160237591; 20160225490; 20160167010; 20160165926; 20160160240; 20160090614; 20160075953; 20160038906; 20160038905; 20160033492; 20160032341; 20160024374; 20160009554; 20150368762; 20150354426; 20150353974; 20150344914; 20150344143; 20150342224; 20150329879; 20150299494; 20150275108; 20150267036; 20150265997; 20150234304; 20150217260; 20150211730; 20150203701; 20150184090; 20150183641; 20150152344; 20150122802; 20150122529; 20150122243; 20150104843; 20150075839; 20150044122; 20150021094; 20150004669; 20140374237; 20140348982; 20140334999; 20140329961; 20140329280; 20140329091; 20140197854; 20140197154; 20140183185; 20140182563; 20140182366; 20140182272; 20140154749; 20140148568; 20140147907; 20140033777; 20140030768; 20140030763; 20130315028; 20130303810; 20130295624; 20130288307; 20130273612; 20130266556; 20130261340; 20130225714; 20130216520; 20130196386; 20130183735; 20130175068; 20130164818; 20130150533; 20130122764; 20130102029; 20130101326; 20130056209; 20130026752; 20130011895; 20120316376; 20120315060; 20120309100; 20120309060; 20120291343; 20120289734; 20120283449; 20120277329; 20120268219; 20120267448; 20120267359; 20120237984; 20120231197; 20120215023; 20120203021; 20120202994; 20120142068; 20120142065; 20120094358; 20120094355; 20120077247; 20120065307; 20120039781; 20120017422; 20120003704; 20110303532; 20110301363; 20110300029; 20110297623; 20110272082; 20110271588; 20110232169; 20110209897; 20110179907; 20110155559; 20110147639; 20110147041;

20110111456; 20110094772; 20110081336; 20110081335; 20110067576; 20110056124; 20110052460; 20110042201; 20110042084; 20110039317; 20110027837; 20110008246; 20100316882; 20100304440; 20100304439; 20100258309; 20100258291; 20100258290; 20100258265; 20100249404; 20100224368; 20100209056; 20100206570; 20100179315; 20100155070; 20100147522; 20100147521; 20100124583; 20100112242; 20100108567; 20100108379; 20100108310; 20100101823; 20100101794; 20100101784; 20100101783; 20100096137; 20100089586; 20100089584; 20100087687; 20100072429; 20100071904; 20100071903; 20100069656; 20100055349; 20100032308; 20100021748; 20090311445; 20090286295; 20090272578; 20090272536; 20090272535; 20090272533; 20090272526; 20090260824; 20090260823; 20090257945; 20090236329; 20090233349; 20090208684; 20090200854; 20090200290; 20090200031; 20090200025; 20090200023; 20090200022; 20090194524; 20090194333; 20090194329; 20090194287; 20090194286; 20090194282; 20090194269; 20090189617; 20090184281; 20090074905; 20090074630; 20090025425; 20090023821; 20090014121; 20090011180; 20080319375; 20080311045; 20080294089; 20080274280; 20080264330; 20080243049; 20080223851; 20080197534; 20080187907; 20080182911; 20080182027; 20080156228; 20080149363; 20080142367; 20080124994; 20080035682; 20070210075; 20070204512; 20070110985; 20070068933; 20060289481; 20060115595; 20060068080; 20060051281; 20050287297; 20050255370; 20050212297; 20050208218; 20050121437; 20050107251; 20040249037; 20040229295; 20040185384; 20040180203; 20040170820; 20040157002; 20040155096; 20040150311; 20040149737; 20040149297; 20040139888; 20040129555; 20040127012; 20040076810; 20040050839; 20030220039; 20030212179; 20030207112; 20030175196; 20030121909; 20030075540; 20030071033; 20020102353; 20010024716; U.S. Pat. Nos. 9,803,222; 9,758,638; 9,745,609; 9,745,604; 9,700,868; 9,695,280; 9,676,491; 9,657,622; 9,618,947; 9,607,732; 9,605,288; 9,605,287; 9,587,258; 9,528,322; 9,517,444; 9,493,796; 9,475,698; 9,446,371; 9,409,140; 9,404,005; 9,400,439; 9,352,294; 9,347,661; 9,334,843; 9,309,545; 9,290,780; 9,285,403; 9,283,537; 9,278,896; 9,212,591; 9,208,923; 9,187,769; 9,186,646; 9,175,137; 9,163,114; 9,138,715; 9,132,407; 9,129,728; 9,109,241; 9,101,880; 9,089,628; 9,078,461; 9,074,566; 9,062,328; 9,058,918; 9,051,829; 9,044,900; 9,023,628; 9,023,183; 9,022,118; 9,010,428; 8,999,030; 8,980,602; 8,946,489; 8,900,839; 8,881,806; 8,877,472; 8,876,923; 8,871,964; 8,852,905; 8,852,896; 8,851,170; 8,849,142; 8,846,356; 8,841,101; 8,835,142; 8,771,480; 8,764,978; 8,764,948; 8,763,231; 8,752,904; 8,747,624; 8,734,654; 8,734,643; 8,728,779; 8,716,537; 8,709,771; 8,709,768; 8,708,691; 8,680,399; 8,647,401; 8,637,284; 8,636,323; 8,609,384; 8,603,787; 8,597,921; 8,576,017; 8,576,016; 8,569,526; 8,568,507; 8,562,078; 8,536,497; 8,529,738; 8,518,683; 8,497,366; 8,492,128; 8,475,760; 8,455,580; 8,454,803; 8,448,707; 8,434,555; 8,414,664; 8,382,970; 8,372,327; 8,362,407; 8,357,883; 8,353,347; 8,329,936; 8,327,932; 8,292,987; 8,281,861; 8,276,661; 8,276,636; 8,272,455; 8,267,185; 8,267,170; 8,261,832; 8,256,512; 8,240,774; 8,236,535; 8,220,539; 8,212,087; 8,197,889; 8,196,658; 8,192,809; 8,177,305; 8,172,335; 8,168,038; 8,162,405; 8,162,059; 8,158,818; 8,153,942; 8,151,907; 8,146,669; 8,146,661; 8,142,620; 8,113,272; 8,083,906; 8,080,735; 8,057,666; 8,017,892; 8,011,451; 7,976,692; 7,955,508; 7,932,065; 7,931,784; 7,866,388; 7,866,386; 7,863,522; 7,827,822; 7,816,415; 7,816,006; 7,794,797; 7,776,383; 7,745,355; 7,713,350; 7,655,703; 7,569,624; 7,559,494; 7,517,829; 7,473,873; 7,413,793; 7,390,360; 7,387,673; 7,365,289; 7,361,207; 7,341,285; 7,323,666; 7,233,101; 7,205,513; 7,185,659; 7,168,534; 7,070,743; 7,033,650; 6,926,949; 6,858,521; 6,858,302; 6,849,837; 6,849,109; 6,830,822; 6,803,550; 6,726,962; 6,710,314; 6,689,252; 6,639,198; 6,639,197; 6,630,113; 6,624,337; 6,603,054; 6,509,555; 6,383,706; 6,315,972; 6,261,679; 6,215,678; 6,086,792; 6,066,825; 6,018,471; 6,001,204; 5,958,273; 5,878,752; 5,847,353; 5,846,495; 5,820,835; 5,781,289; 5,737,839; 5,651,906; 5,443,727; 5,423,372; 5,350,003; 5,325,601; 5,321,896; 5,240,682; 5,200,145; 5,152,048; 5,110,996; 5,075,090; 4,952,539; 4,921,531; 4,729,891; 4,716,064; 4,237,111; 4,105,455; and 3,972,372, each of which is expressly incorporated herein by reference in its entirety. Catalysts may be produced according to, e.g., U.S. 20140187416, and U.S. Pat. No. 9,421,523.

Organic chemical hydrides employ hydrogenation-dehydrogenation of cyclic hydrocarbons or heteroaromatic compounds as a means to store and transport hydrogen. Aromatic compounds, such as benzene, toluene, and naphthalene can be hydrogenated by using appropriate metal catalysts under relatively mild conditions, e.g. about 100° C. and 2 MPa. However, the dehydrogenation of cyclic hydrocarbons is endothermic and the reaction is favored only at high temperatures as well as having problems with coking on catalyst surfaces requiring catalyst regeneration every 1-2 hours. Catalytic dehydrogenation under "liquid-film state" conditions has been reported (Meng et al., Int. J. Hydrogen Energy 22:361-367, 1997; Hodoshima et al., Int. J. Hydrogen Energy 28; 197-204, 2003; Hodoshima et al., Appl. Catal. A: Gen. 292:90-96, 2005; and Hodoshima et al., Appl. Catal. A: Gen. 283:235-242, 2005), where the reactant is supplied as a liquid so that the surface of the catalyst is wetted with a thin film. Equilibrium limits were surpassed because of evaporation of the dehydrogenated reactants. Another method uses "wet-dry multiphase conditions" to take advantage of multiple phases to get over thermodynamic equilibrium limitations (Kariya et al., Appl. Catal. A: Gen. 247: 247-259, 2003; and Kariya et al., Appl. Catal. A: Gen 233:91-102, 2002). However, both processes still require relatively high temperatures for vaporization of the volatile components of the process. An important need is also an effective separation of hydrogen from the mixtures to get a pure hydrogen product and to reuse the hydrogen carrier materials.

Hydrogen may be produced by reacting a compound capable of producing hydrogen and having the formula R—XH, with a catalytic substrate to produce hydrogen gas. See, US 20070003476, 20080045408, 20080045412, 20090093886, U.S. Pat. Nos. 7,186,396, 8,459,032, and 8,535,381.

The R group includes, for example, a moiety selected from an alkyl, heteroalkyl, alkenyl, substituted alkenyl, substituted alkyl, alkynyl, aryl, heteroaryl, alkoxy, cycloalkyl, heterocyclic, alkylaryl, arylalkyl, arylalkenyl, arylalkynyl, arylene, oxyarylene group, and combinations thereof. The compound may be a liquid at standard temperature and pressure. X can include sulfur, oxygen, or selenium, or other heteroatoms, such as nitrogen, phosphorus, and boron. Sulfur is a typically heteroatom, and the compound may be an organothiol. As used herein, "substituted" refers to organic or heterorganic groups further bearing one or more substituents selected from hydroxy, alkoxy, mercapto, cycloalkyl, substituted cycloalkyl, heterocyclic, substituted heterocyclic, aryl, substituted aryl, heteroaryl, substituted heteroaryl, aryloxy, substituted aryloxy, halogen, cyano, nitro, amino, amido, —C(O)H, acyl, oxyacyl, carboxyl, sulfonyl, sulfonamide, sulfuryl, and the like. Known compounds suitable for storage and production of hydrogen by dehydrogenation of hydrocarbon moiety include, for example, butanethiol, pentanethiol, hexanethiol, cyclohexanethiol, and 1,4-cyclohexandithiol.

Heteroatom aromatic rings for $H_2$ storage were proposed because the addition of electron-donating groups favors $H_2$ release both thermodynamically and kinetically at moderate temperatures. In the case of indoline, dehydrogenation is possible at modest temperature (110° C.) (Moores et al., New J. Chem. 30:1675-1678, 2006). Benzimidazolines, including N,N'-dimethyldihydrobenzimidazole, 1,3-dimethyl-2-phenylbenzimidazoline, and 1,3-dimethylbenzimidazoline, were studied with different palladium catalysts, releasing H.sub.2 even at 80.degree. C. (Schwarz et al., Chem. Commun. 5919-5921, 2005).

However, hydrogen density is an important factor in hydrogen storage. Therefore, a high hydrogen/weight ratio is desired while maintaining favorable thermochemical and kinetic parameters. Smaller molecules, such as 4-aminopiperidine and piperidine-4-carboxamide are proposed compounds for reversible hydrogen storage (Cui et al., New J. Chem. 32:1027-1037, 2008). Dehydrogenation and hydrogenation of 4-aminopiperidine and piperidine-4-carboxamide occur at low temperatures without by-products, such as C—N cleavage and hydrogenolysis products. Dehydrogenation may be favored in five-membered rings over six member rings and by the incorporation of N heteroatoms into the rings, either as ring atoms or as ring substituents, particularly in 1, 3 positions (Clot et al. Chem. Commun. 2231-2233, 2007). Heteroaromatic ligands have been used for reversible hydrogenation/dehydrogenation, specifically N-ethyl carbazole hydrogenated with 72 atm and a Pd catalyst at 160° C. and dehydrogenated with Ru at 50-197° C. See, U.S. Pat. Nos. 7,351,395, and 7,186,396.

One form of hydrogen fuel for release, storage and recycling of hydrogen fuels uses a sulfur-containing heteroatom that is cyclized on dehygrogenation and when re-hydrogenated the ring is broken to form a linear, thiol-containing alkane moiety.

Spent forms of recyclable liquid fuels that release hydrogen gas, include aromatic compounds such as benzene and naphthlene (aromatic substrates) that undergo reversible hydrogenation to form cyclohexane and decalin, respectively. U.S. Pat. No. 6,074,447, for example, describes dehydrogenating methylcyclohexane, decalin, dicyclohexyl, and cyclohexane to toluene, naphthalene, biphenyl and benzene, respectively in the presence of an iridium catalyst at temperatures of 190° C. or higher. Yet even at such temperatures, hydrogen release reactions require several minutes for full release and often exist as solids at room temperatures.

Catalytic metal substrates suitable for reacting with the compound to produce hydrogen can include, for example, gold, silver, platinum, copper, and mercury. Metal substrates can include pure metal substrates as well mixtures of metals, such as metal alloys and a polymer coated with metals. The metal may be nanoporous, or provided as nanoparticles.

The hydrogen so produced may be used in mobile applications, such as vehicles and electronic devices, and may be combusted, consumed in a fuel cell, or used in a chemical reaction.

The compound capable of producing hydrogen is preferably suitable for re-use, in that spent compound is capable of being regenerated. A spent compound can include, for example, a dimeric compound, such as a compound having a formula R—X—X—R. The energy source used to drive the endothermic hydrogen release reaction can include, for example, a heat source or a UV light source.

In normal catalytic hydrogenation, the catalyst surface breaks the bond between hydrogen molecule homolytically (H—H 436 kJ/mole) and the catalyst forms a new bond with hydrogen. Because the metal-hydrogen bonds lack stability, the hydrogen atoms can leave the surface as hydrogen gas. A hydrocarbon moiety (e.g., R as defined above) of the hydrogen producing compound is typically the source of hydrogen.

The dehydrogenation reaction of the organic compound is endothermic, and requires an external heat source for continuous operation. It is known to provide a thermocouple integrated into walls of a microchannel reactor. See, e.g., U.S. 20090185964, and U.S. Pat. No. 8,092,558.

According to one process, hydrogen is released from an alkane thiol and capturing a dehydrogenated product. Specifically, the disclosed process for releasing hydrogen gas from a $C_{5-7}$ alkane thiol comprises: providing an alkane thiol in a gaseous phase; exposing the alkane thiol to a catalyst having particle sizes of about 2 nm to 500 nm, at a temperature of from about 150° C. to about 300° C. to form a five-membered cyclic thioether, substituted with from 1-2 methyl or ethyl groups and at least one mole of diatomic hydrogen gas; and exposing the cyclic thioether product to another catalyst at a temperature of from about 130° C. to about 400° C. to form a thiophene and two more moles of diatomic hydrogen gas. See, U.S. 20110020214, and U.S. Pat. No. 9,623,393. Preferably, the initial catalyst has an average particle size of from about 500 nm to about 2 nm, comprising gold without nickel or chrome. The catalyst may be a particle selected from the group consisting of $Au/TiO_2$, $Pt/SiO_2$, $Ag/SO_2$, $Au/Al_2O_3$, $Pt/Al_2O_3$, $Pd/Al_2O_3$, $Rh/Al_2O_3$, and combinations of metals Au, Pt, Ag, Au, Pt, Pd and Rh with ceramic particles selected from the group consisting of $TiO_2$, $SO_2$, $SiO_2$, $Al_2O_3$ and combinations thereof. The process may further capture the cyclic thioether as a liquid or gaseous phase. The alkane thiol may be a pentane thiol or a hexane thiol or a heptane thiol, each having the thiol moiety at the N1 position or a mixture thereof. The second catalyst surface may be is a platinum or gold or platinum/gold combination catalyst surface. See, U.S. 20110020214, U.S. Pat. No. 9,623,393, and 8,535,381.

Microchannel reactors, which term is intended by definition to include monolith reactors, are well suited for a vapor phase dehydrogenation process. They offer ability to effect the dehydrogenation of hydrogen fuel sources while obtaining excellent heat transfer and mass transfer. One can pump the liquid fuel to a vaporizer which then enters a reactor containing the appropriate catalyst. Thus, pressure drop does not become an insurmountable problem as it is in gas phase production of hydrogen. Microchannel reactors and monolith reactors are known in the art. The microchannel reactors are characterized as having at least one reaction channel having a dimension (wall-to-wall, not counting catalyst) of 2.0 mm (preferably 1.0 mm) or less, and in some embodiments 50 to 500 µm. The height and/or width of a reaction microchannel is preferably 2 mm or less, and more preferably 1 mm or less. The channel cross section may be square, rectangular, circular, elliptical, etc. The length of a reaction channel is parallel to flow through the channel. These walls are preferably made of a nonreactive material which is durable and has good thermal conductivity. Most microchannel reactors incorporate adjacent heat transfer microchannels, and in practice, such reactor scheme generally is necessary to provide the heat required for the endothermic dehydrogenation. Illustrative microchannel reactors are shown in U.S. 2004/0199039 and U.S. Pat. No. 6,488,838 and are incorporated by reference herein. Monolith supports, which may be catalytically modified and used for catalytic dehydrogenation, are honeycomb structures of long narrow capillary channels, circular, square or rectangular, whereby the vaporized fuel and generated dehydrogenated product and hydrogen gas can co-currently pass through the channels. Typical dimensions for a honeycomb monolith catalytic reactor cell wall spacing range from 1 to 10 mm between the plates. Alternatively, the monolith support may have from 100 to 800, preferably 200 to 600 cells per square inch (cpi). Channels or cells may be square, hexagonal, circular, elliptical, etc. in shape.

In a representative dehydrogenation process, a liquid fuel, such as tetrahydrothiophene, is vaporized by means of a pump to a reaction pressure, e.g., 1000 psia and delivered via a manifold to a plurality of reaction chambers (monoliths) within a first microchannel reactor. Overall dehydrogenation pressures may range from 0.2 to 100 atmospheres. Dehydrogenation catalyst particles are packed within the monoliths, although, as an alternative, the catalyst may be embedded, impregnated or coated onto the wall surface of the monoliths. The reaction channel through the monoliths may be a straight channel or with internal features such that it offers a large surface area to volume of the channel.

According to the prior art, heat is supplied to the microchannel reactor by a series of band heaters. Alternatively, there may be a circulating a heat exchange fluid through a series of heat exchange channels adjacent to the monoliths. The heat exchange fluid may advantageously carry waste heat, such as a gaseous byproduct of combustion which may be generated in a hybrid vehicle or hydrogen internal combustion engine or it may be a heat exchange fluid employed for removing heat from fuel cell operation. In some cases, where a liquid heat exchange fluid is employed, as for example heat exchange fluid from a fuel cell, supplemental heat may be added, through the use of a combustion gas or thermoelectric unit. The heat exchange fluid from a PEM (proton exchange membrane) fuel cell typically is recovered at a temperature of about 80° C., which is at the low end of the temperature for dehydrogenation. By the use of combustion gases it is possible to raise the temperature of the heat exchange fluid to provide the necessary heat input to support dehydrogenation of many of the fuel sources. A heat exchange fluid from fuel cells that operate at higher temperatures, e.g., 400° C. may also be employed. Dehydrogenation is typically carried out in microchannel reactor at a temperature of generally from about 200 to 400° C. Dehydrogenation is favored by higher temperatures, elevated temperatures; e.g., 400° C. and above may be required to obtain a desired dehydrogenation reaction rate.

All references cited herein are expressly incorporated by reference in their entirety.

SUMMARY OF THE INVENTION

Various aspects of the present technology are directed to efficient multi-channel chemical reactors, having a multichannel core with catalytic surfaces, having varying composition along their lengths. The channels are heated by providing an oscillating magnetic field that dissipates energy within the volume of the reactor in a frequency selective manner.

For example, different regions of the reactor have compositions and structures with different frequency-selective absorptivity for the magnetic energy, and therefore heat at different rates and/or achieve different temperatures under a fixed inductive excitation. The inductive excitation includes, over a period of time, excitation energy characteristics intended to impart a desired amount of energy within each voxel of the reactor. According to one embodiment, the frequency of the inductive excitation is swept over time, and the energy and duration within each frequency range controlled to provide the controlled heating. According to another embodiment, the inductive excitation concurrently includes a plurality of frequency components, so that many regions of the reactor are targeted for energy transfer at a time. For example, multiple frequencies may be superposed, or a direct sequence spread spectrum (DSSS) may be employed with arbitrarily controlled energy as a function of frequency. Conveniently, an inverse Fourier transform may be used to map a histogram of energy intensity as a function of frequency, to a continuous wave having those characteristics.

The present invention therefore provides a heterogeneous core which supports a catalytic surface in a multichannel catalytic reactor. The system is designed for endothermic reactions, which require a supply of external energy to maintain the reaction. In an exothermic reaction, the reactant(s) emit heat, and the issue becomes heat shedding, in which case the center of the core gets hotter than the exterior heat sink surface. Further, the endothermic reactions considered, e.g., certain dehydrogenation and hydrogenation reactions, occur at temperatures that do not compel use of refractory materials. For example, a dehydrogenation reaction may be conducted below 300° C., and thus a metallic core may be used.

A metallic multichannel core may be formed by lasersintering stainless steel in an additive manufacturing process. The catalytic coating is, e.g., cobalt nanoparticles, 3% by weight in alumina. In a typical design, the channels are 500 μm wide, and the walls are 300 μm wide, with ~1000 channels passing through the reactor.

A metallic core according to the present technology may be formed by altering the composition of the laser-sinterable metal as a function of position in the device. For example, the alloy may be varied by position, to include austenitic, ferritic and martensitic forms, which have different magnetic properties. Further, other metals which may remain in separate phases may also be added, such as copper, cobalt, nickel, vanadium, other catalysts, etc. Typically, during operation, the metal is not exposed to oxidizing conditions, and as a result, corrosion will be suppressed, even if a generally unstable combination with respect to corrosion is formed.

In addition to varying composition, selectively conductive loops may be formed within a less conductive matrix may be formed, which resonate at different frequencies. Therefore, the frequency of excitation with select certain conductive loops and not couple with others. The loop structures impart properties of a metamaterial to the device.

In a preferred configuration, high frequencies address the peripheral region of the core, while low frequencies penetrate the core and excite the center of the core.

Therefore, in order to supply heat in a manner which avoids large temperature differences across the reactor, the walls of the multichannel reactor are formed with a conductive material having heterogeneous composition and/or configuration, such that an external inductive coil can couple to the conductive material, and induce current flows, resulting in Joule and/or hysteresis heating. The variations in the wall composition and/or structure as a function of location, makes spatial control over energy absorption possible.

A time-varying frequency composition electromagnetic signal, or a shaped noise signal (concurrent plurality of frequencies) may be emitted to optimally excite and heat the catalytic reactor.

In addition to varying as a function of depth within the bundle of the multichannel reactor, the energy dissipation may also vary as a function of length along the reactor.

It is therefore an object to provide a chemical reactor comprising a plurality of channels through a core, having a plurality of regions having respectively different frequency-dependent inductive coupling characteristics to an externally applied oscillating magnetic field.

It is a further object to provide a method of operating a chemical reactor, comprising a plurality of channels through a core, having a plurality of regions having respectively different frequency-dependent inductive coupling characteristics to an externally applied oscillating magnetic field, the method comprising: exciting an oscillating magnetic field comprising a plurality of different frequencies, surrounding the core; and passing at least one chemical reactant through the plurality of channels.

It is a still further object to provide a chemical reactor, comprising: a core, having a plurality of reactant flow channels, the plurality of flow channels having a plurality of regions having respectively different frequency-dependent inductive coupling characteristics to an externally applied oscillating magnetic field; a controller, configured to generate an oscillating electrical signal having a controllable frequency having a range, e.g., of 1:1.5, 2:1, 1:3, 1:4, 1:5, 1:7.5, 1:10, 1:15, and/or 1:20; and a coil, receiving the oscillating electrical signal and generating the externally applied oscillating magnetic field.

The core may comprise a conductive metal having a heterogeneous composition as a function of position. At least one first portion of the core may comprise at least one region which is subject to Joule heating but not hysteresis heating, and at least one second portion which is subject to hysteresis heating.

The chemical reactor may comprise at least one conductive loop having a resonant coupling frequency.

The core may comprise steel and/or copper. The core may comprise at least one first region comprising principally steel and at least one second region comprising principally copper.

The chemical reactor may be provided in combination with an inductive coil, configured to inductively heat the core by generating the oscillating magnetic field when excited by a corresponding electrical signal.

The chemical reactor may also be provided in combination with a controller configured to generate the corresponding electrical signal, having at least two different frequencies of emission representing at least two corresponding regions of the core. Alternately, the chemical reactor may be provided in combination with a controller configured to generate the corresponding electrical signal, comprising a direct sequence spread spectrum signal concurrently representing a plurality of frequencies of emission for controlling separately controlled a temperature of the plurality of regions of the core. The control signal may be a stationary or slowly changing multifrequency or spread spectrum signal, or a single frequency agile signal. The plurality of regions having respectively different inductive coupling characteristics may have inductive coupling characteristics that vary as a function of both depth within the core and distance along the channel.

The chemical reactor may further comprise a catalytic coating on a surface of the plurality of channels, a coating of the surface of the plurality of channels comprising catalytic nanoparticles in a metal oxide carrier, or a coating of the surface of the plurality of channels comprising cobalt catalytic nanoparticles in an aluminum oxide carrier.

The chemical reactor may comprise a first region which is subject to hysteresis heating at a first frequency and a second region which is not subject to hysteresis heating at the first frequency, such that the first region has a higher specific absorption of energy at the first frequency than the second region, wherein the second region is subject to a larger amount of Joule heating at a second frequency than at the first frequency. The second region may have a higher specific absorption of energy at the second frequency than the first region.

The chemical reactor may be configured to catalytically dehydrogenate an organic hydrogen carrier at a peak temperature below about 400° C. to produce a dehydrogenated organic carrier and hydrogen, substantially without degradation of the dehydrogenated organic carrier within the plurality of channels.

The chemical reactor may be provided in combination with a hydrogen fuel cell. For example, the chemical reactor may be operated to dehydrogenate a hydrogen carrier organic molecule, and the hydrogen released may be used to produce electrical power in a hydrogen fuel cell.

BRIEF DESCRIPTION OF THE FIGURES

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION OF THE INVENTION

Figure 1:
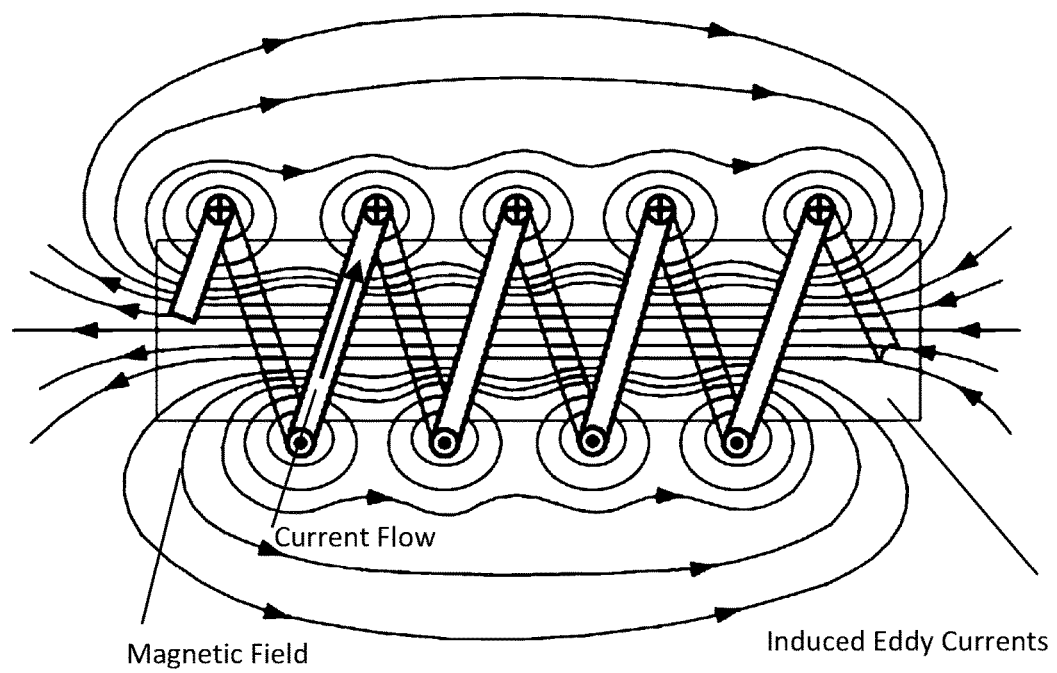
FIG. 1 shows an induction heater that provides alternating electric current to an electric coil.

The currently disclosed chemical reactor provides an efficient way to heat reactor channels.

A multi-channel reactor according to a preferred design has a ceramic core with channels having square (or other cross section) cross-sections measuring approximately 1 mm on a side, running parallel down the length of the core.

The reactor is typically used an endothermic catalytic reaction, requiring external heat not provided in the reactant feedstream to support the reaction. The channels of one implementation of the present chemical reactor are heated under regional or individual control, to a desired temperature. Therefore, variations in temperature may be controlled or minimized.

Inductive Heating

Induction heating is the process of heating an electrically conducting object (usually a metal) by electromagnetic induction, through heat generated in the object by eddy currents. An induction heater consists of an electromagnet, and an electronic oscillator that passes a high-frequency alternating current (AC) through the electromagnet. The rapidly alternating magnetic field penetrates the object, generating electric currents inside the conductor called eddy currents. The eddy currents flowing through the resistance of the material heat it by Joule heating. In ferromagnetic (and ferrimagnetic) materials like iron, heat may also be generated by magnetic hysteresis losses. The frequency of current used depends on the object size, material type, coupling (between the work coil and the object to be heated) and the penetration depth. Induction heating can produce high power densities which allow short interaction times to reach the required temperature. This gives tight control of the heating pattern with the pattern following the applied magnetic field quite closely and allows reduced thermal distortion and damage.

The basic setup is an AC power supply that provides electricity with low voltage but very high current and high frequency. The workpiece to heat is placed inside an air coil driven by the power supply, usually in combination with a resonant tank capacitor to increase the reactive power. The alternating magnetic field induces eddy currents in the workpiece. The frequency of the inductive current determines the depth that the induced eddy currents penetrate into the workpiece. In the simplest case of a solid round bar, the induced current decreases exponentially from the surface. An "effective" depth of the current-carrying layers can be derived as $$d = 5000\sqrt{\frac{\rho}{\mu f}},$$

where d is the depth in centimeters, $\rho$ is the resistivity of the workpiece in ohm-centimeters, $\mu$ is the dimensionless relative magnetic permeability of the workpiece, and f is the frequency of the ac field in Hz. The equivalent resistance of the workpiece and thus the efficiency is a function of the workpiece diameter a over the reference depth d, increasing rapidly up to about a/d=4. Since the workpiece diameter is fixed by the application, the value of a/d is determined by the reference depth. Decreasing the reference depth requires increasing the frequency. Since the cost of induction power supplies increase with frequency, supplies are often optimized to achieve a critical frequency at which a/d=4. If operated below critical frequency, heating efficiency is reduced because eddy currents from either side of the workpiece impinge upon one another and cancel out. Increasing the frequency beyond the critical frequency creates minimal further improvement in heating efficiency, although it is used in applications that seek to heat treat only the surface of the workpiece.

Induction heating thus occurs due to electromagnetic flux producing an electrical current in a part. The parts heat due to the resistance to the flow of this electric current.

See, en.wikipedia.org/wiki/Induction_heating

Resistance

All metals conduct electricity, but offer varying degrees of resistance. The resistance to the flow of current causes losses in power that are manifest as heat. This is because, according to the law of conservation of energy, energy is transformed from one form to another, but is not lost. The losses produced by resistance are based upon the basic electrical formula: $P=i^2R$, where i is the amount of current in amps, and R is the resistance in ohms, and P is power in watts. The amount of power loss (heating) is proportional to the square of the current, and the process is also known as Joule heating.

Induction heaters are used to provide alternating electric current to an electric coil (the induction coil). The induction coil becomes the electrical (heat) source that induces an electrical current into the metal part to be heated (called the workpiece). No contact is required between the workpiece and the induction coil as the heat source, and the heat is restricted to localized areas or surface zones immediately adjacent to the coil. This is because the alternating current (AC) in an induction coil induces a surrounding magnetic field, which causes a flow of current within the adjacent conductive workpiece. FIG. 1 shows an induction heater that provides alternating electric current to an electric coil.

Hysteresis

Magnetic materials improve the induction heat process because of hysteresis. Materials with high permeability (100-500), such as steel, nickel, and a few other metals, are easier to heat with induction heating. Hysteresis heating occurs below the Curie temperature where materials retain their magnetic properties. High permeability below the Curie temperature in the workpiece is useful. Temperature difference, mass, and specific heat influence the workpiece heating.

Figure 2:
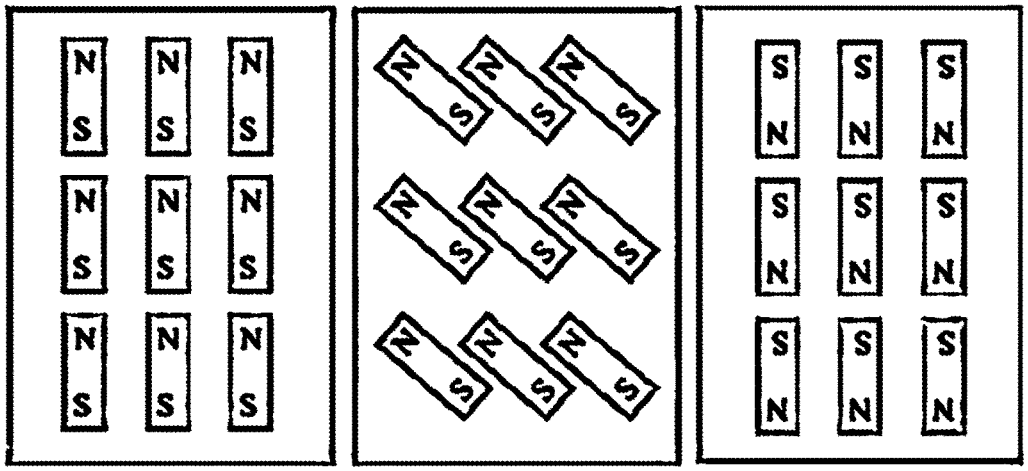
FIG. 2 shows the effect of hysteresis on heating rate.
Figure 2:
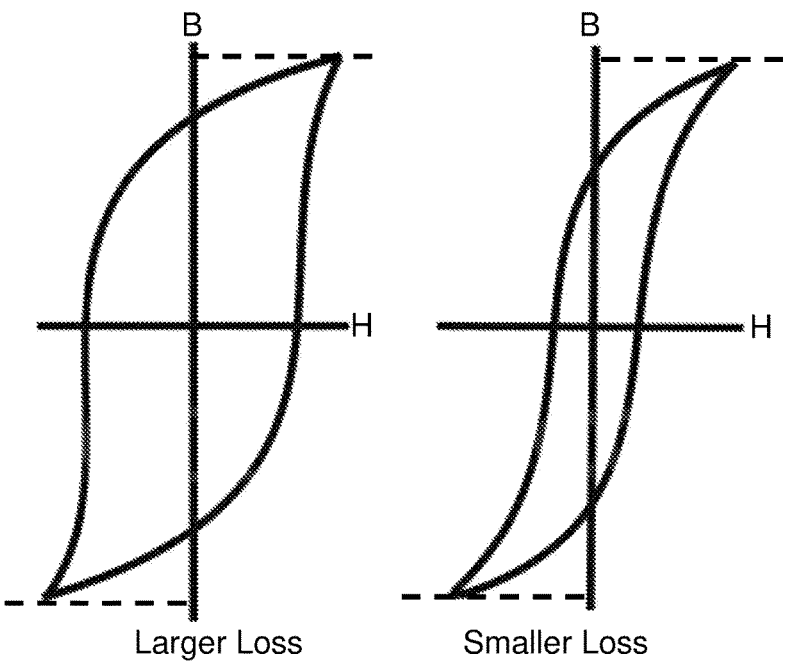
Figure 3:
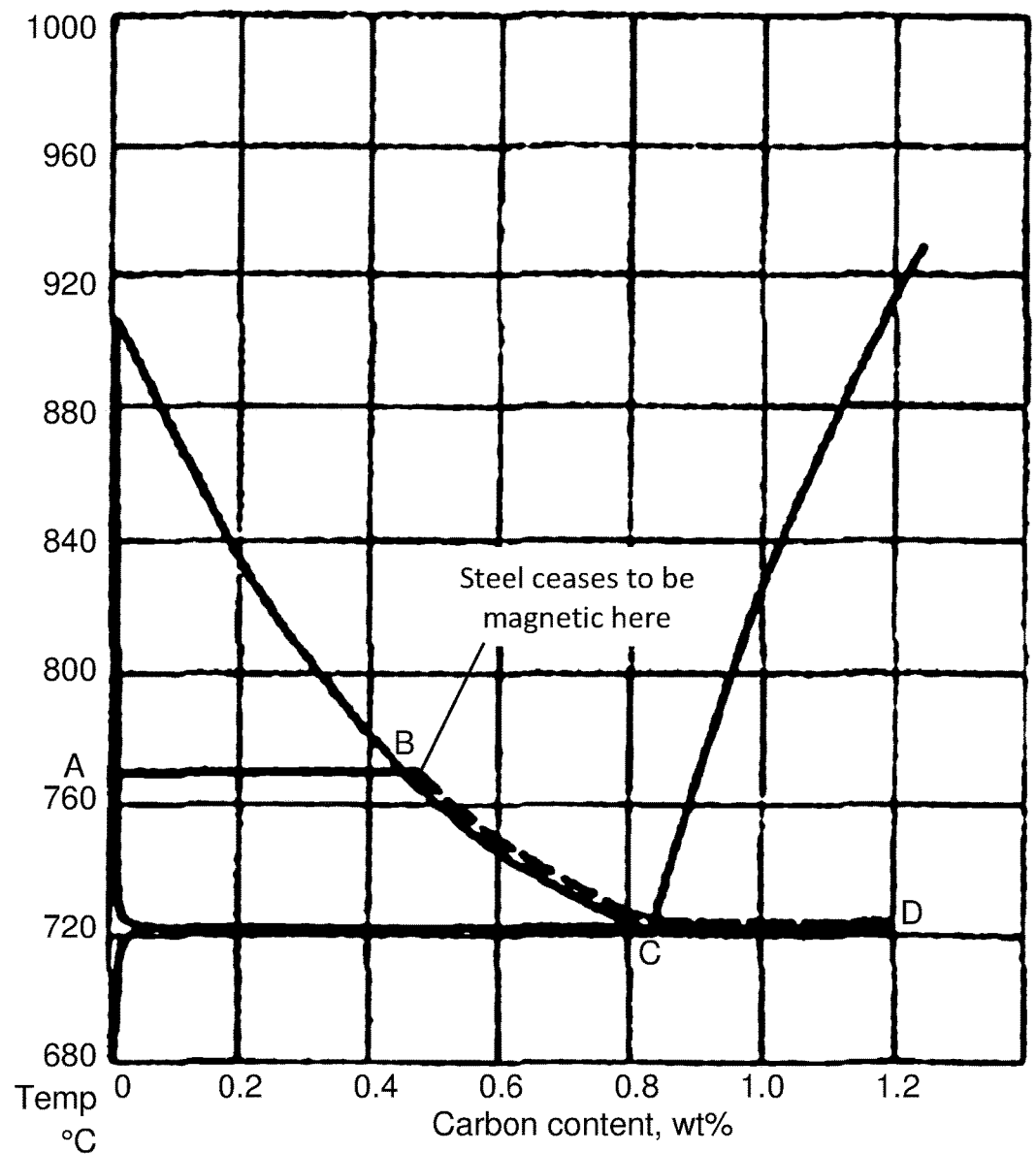
FIG. 3 shows the relationship between Curie temperature and the carbon content of steel.

As magnetic parts, such as those made from carbon steels, are heated, the alternating magnetic flux field causes the magnetic dipoles of the material to oscillate. As the magnetic poles change their polar orientation every cycle, heat is generated. This oscillation is called hysteresis, and a minor amount of heat is generated due to the friction produced when the dipoles oscillate. When steels are heated above Curie temperature, they become nonmagnetic, and hysteresis ceases. Because the heated steel is nonmagnetic, no reversal of dipoles can occur. FIG. 2 shows the effect of hysteresis on heating rate. FIG. 3 shows the relationship between Curie temperature and the carbon content of steel.

Skin Effect and Depth of Penetration

Induction heating occurs when an electrical current (eddy current) is induced into a workpiece that is a poor conductor of electricity. For the induction heating process to be efficient and practical, certain relationships of the frequency of the electromagnetic field that produces the eddy currents and the properties of the work piece need to be satisfied. The basic nature of induction heating is that the eddy currents are produced on the outside of the workpiece in what is often referred to as "skin effect" heating. Because almost all of the heat is produced at the surface, the eddy currents flowing in a cylindrical workpiece will be most intense at the outer surface, while the currents at the center are negligible. The depth of heating depends on the frequency of the AC field, the electrical resistivity, and the relative magnetic permeability of the workpiece. For practical purposes, the skin heating effect (reference depth) is defined as the depth at which approximately 86% of the heating due to resistance of the current flow occurs.

Figure 4:
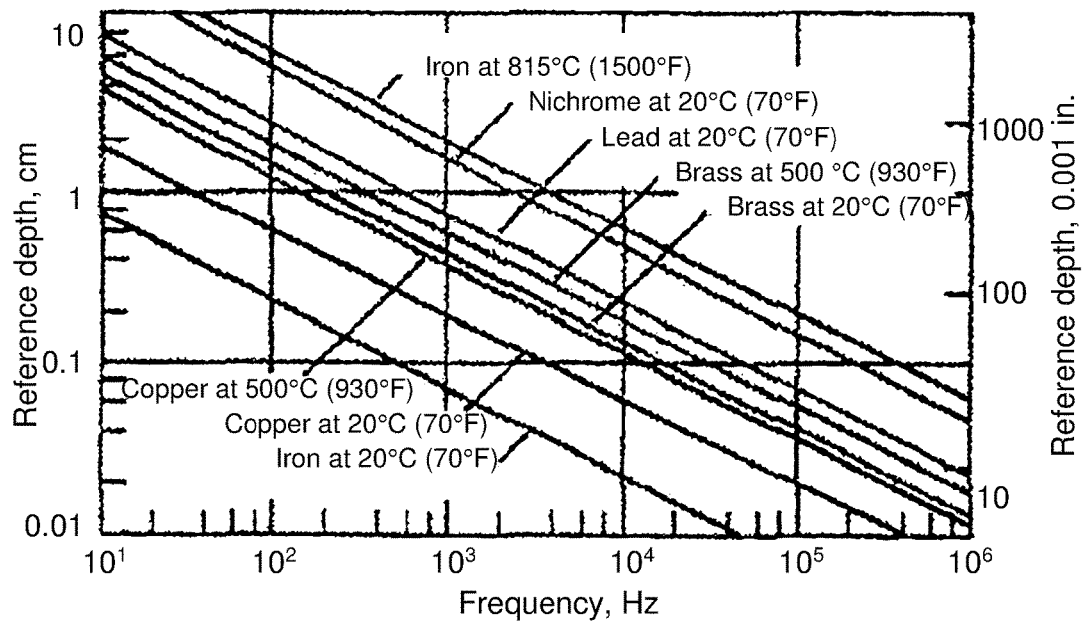
FIG. 4 shows reference depths for various materials.

FIG. 4 shows reference depths for various materials. The reference depths decrease with higher frequency and increase with higher temperature. The reference depth, as mentioned, becomes the theoretical minimum depth of heating that a given frequency will produce at a given power and workpiece temperature. The cross-sectional size of the workpiece being heated must be four times the reference depth, or current cancellation occurs. There is a the critical frequency (or minimum frequency) for heating different bar diameters. As the workpiece thickness/reference depth of heating ratio decreases below four to one, the net current decreases. Net heating curves are obtained by squaring the net current density, demonstrating that when a/d=4, the best surface heat distribution occurs.

For a fixed frequency, the reference depth varies with temperature because the resistivity of conductors varies with temperature. With magnetic steels, the magnetic permeability varies with temperature, decreasing to a value of one (the same as free space) at the Curie temperature, at which steel becomes nonmagnetic. Because the reference depth increases when steel is heated over the Curie temperature, the a/d ratio of 4, when austenitizing, a heat treating process of changing ferrite to austenite, is based on the reference depth when the steel is at a temperature above the Curie temperature. Because of these effects the reference depth of nonmagnetic materials may vary by a factor of two or three over a wide heating range, whereas for magnetic steels it can vary by a factor of 20. The net effect is that cold steel has a very shallow reference depth as compared to hot steel.

From the description above, the basic nature of induction heating is that the eddy currents are produced on the outside surfaces of the workpiece in what is often referred to as "skin effect" heating. By exploiting the skin effect for each channel; each channel has its own conductive metal embedded in the sidewalls of the channels. Thus this skin effect depth has to be changed for each channel for the heating to work correctly. In other words, the magnetic flux density has to change with the frequency to penetrate deeper within the core. Sweeping the frequency from a higher to a lower frequency and changing the amplitude of the current within the driving coil moves the penetration depth from the outer channels to the channels deeper within the core structure.

Examples of heating within various materials and energy requirements is provided below:

$$Q = c_p m \, dT$$

Where
Q=amount of heat (kJ)
$c_p$=specific heat (kJ/kgK)
m=mass (kg)
dT=temperature difference between hot and cold side (K)
Specific heat of Carbon is 0.71 kJ/kg K; Iron is 0.45 kJ/kg K; Nickel is 0.44 kJ/kg K; Copper is 0.39 kJ/kg K;
Molar weight of Carbon is 12.011 g/mol, Fe iron is 55.845 g/mol, Ni nickel is 58.6934 g/mol, Cu copper is 6.3.546 g/mol Channel Heating Requirements:
Volume of the heating element is 0.05 mm×0.5 mm×38.1 mm or 0.9525 mm' or 0.0009525cc
Mass for Carbon heating element is 0.00141 grams, $1.41 \times 10^{-6}$ kg.
Mass for Iron is 0.004905 grams, $4.905 \times 10^{-6}$ kg.
Mass for Nickel is 0.008485 grams, $8.485 \times 10^{-6}$ kg.
Mass for Copper is 0.008525 grams, $8.525 \times 10^{-6}$ kg
$Q = 0.71 \times 1.41 \times 10^{-6} \times 125K = 1.25 \times 10^{-4}$ kJ for Carbon.
$Q = 0.45 \times 4.905 \times 10^{-6} \times 125K = 2.759 \times 10^{4}$ kJ for Iron.
$Q = 0.44 \times 8.485 \times 10^{-6} \times 125K = 4.667 \times 10^{-4}$ kJ for Nickel.
$Q = 0.39 \times 8.525 \times 10^{-6} \times 125K = 4.156 \times 10^{-4}$ kJ for Copper.

One core consists of 1019 channels. Each channel has 1 adjoining wall with the channel next to it. Within the wall is a single section of metal that is used as the heating device. So the number of heating elements is the number of channels plus 1 which equals 1020 heating elements.

Figure 5:
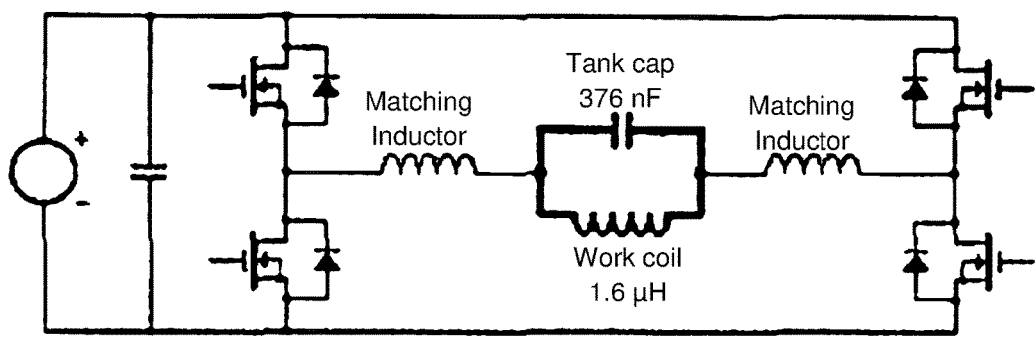
FIG. 5 shows a full bridge induction heater.

For a 1 degree change:
$Q = 0.71 \times 1.41 \times 10^{-6} = 1.0011 \times 10^{-3}$ J for Carbon per heating element.
$Q = 1.0011 \times 10^{-3}$ J×4 = $4.004 \times 10^{-3}$ J for channel.
$Q = 4.004 \times 10^{-3}$ J×1020 = 4.084 J per core per degree C.
For a 125 Degree Celsius change
Q=125×4.084 J=511 Joules
Power in watts=Energy in Joules/Time in seconds
P(w)=E(j)/t(s)
P=511 J/1 second
P=511 watts Reactor Components Control FIG. 5 shows a full bridge induction heater.

Figure 6:
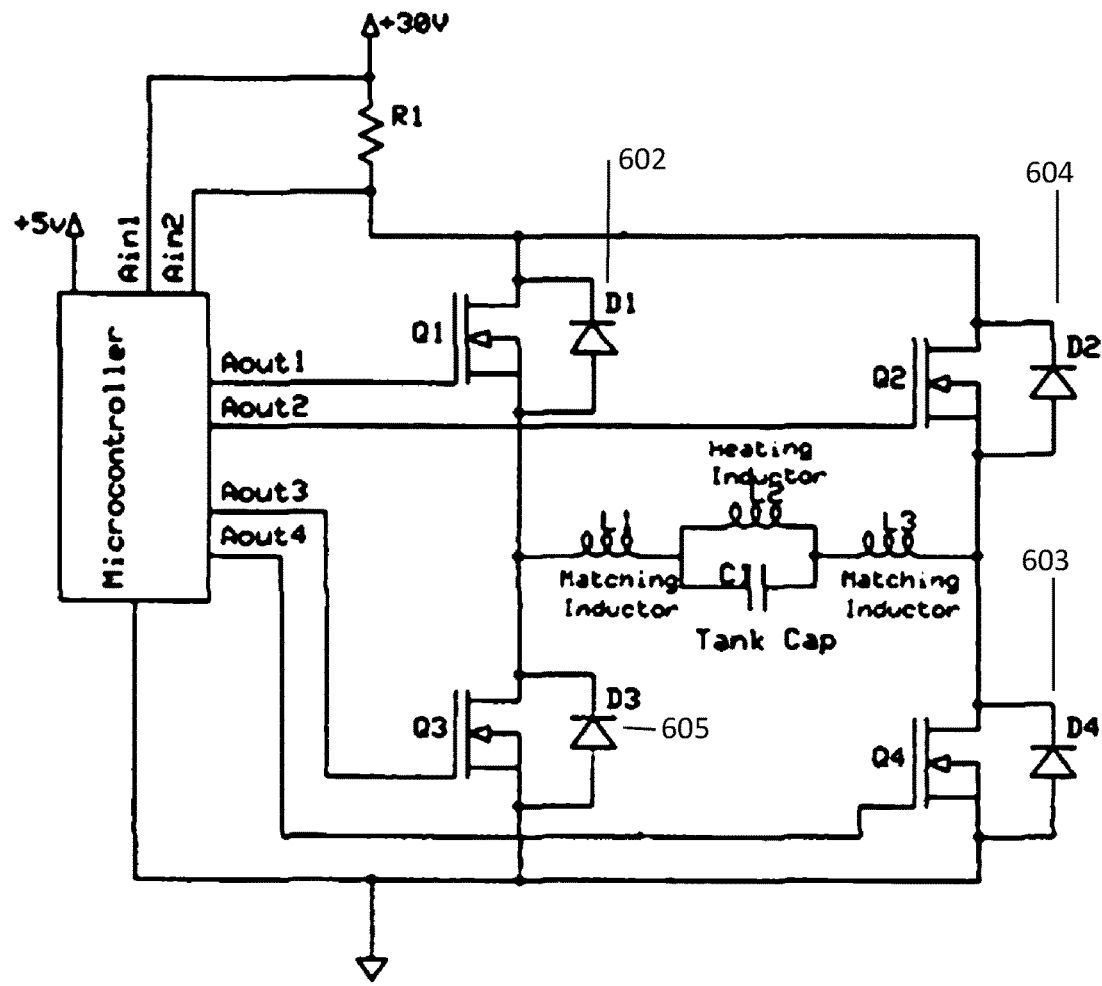
FIG. 6 shows an H-bridge circuit.

FIG. 6 shows an H-bridge circuit. Inductive heating using an H Bridge design is in the current art. However, sweeping of frequency and voltage/current in accordance with the present technology is not. The pulse frequency modulation, or PFM, and the amplitude (or pulse width) of the drive signals originate from a lookup table or are computed on the fly within an embedded controller, which is configured to drive the power semiconductor switches, which may be MOSFET, IGBT, or other types of transistors. By driving N-Channel MOSFET transistor pairs from a digital to analog converter, the pulse width, timing, and amplitude of the drive voltage to the gate of the MOSFET are controlled. Transistor pairs 602-603 come on in one case causing current to flow one way through the coil and align the dipoles along the magnetic flux lines. Then transistor pair 604-605 come on and cause the flow of current to reverse direct through the coil causing the dipoles to rotate 180 degrees from the previous direction. The amplitude of the gate drive voltage controls the amplitude of the current through the inductive excitation coil, which in turn controls the magnetic flux density produced by the inductive coil. The on-versus off-time or duty cycle and frequency of the pulses controls the depth of penetration of the magnetic flux of the inductive coil. Controlled magnetic dipole oscillation is desired, to avoid heating the metal to a point where the dipoles become nonmagnetic, the Curie Point. So we want the control to be in the hysteresis region of the curve.

Channel Description

Figure 7:
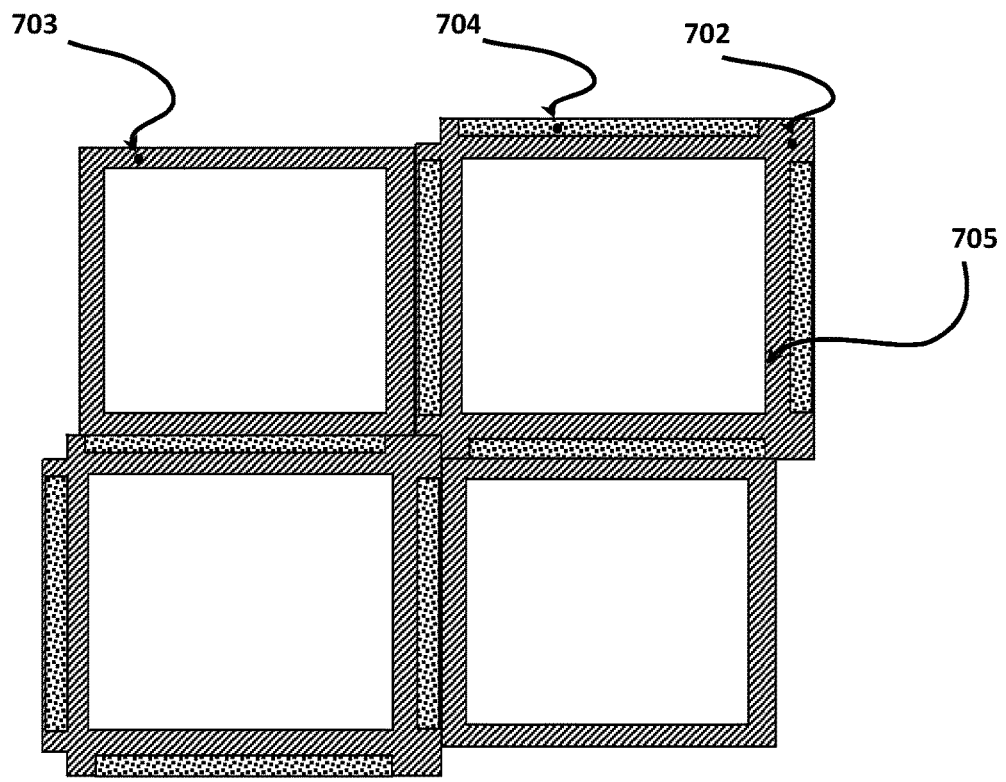
FIG. 7 shows a sample two-channel section of the core where the channel is designed to have different heating regions.

FIG. 7 shows the typical structure of a channel. Items 702-703 show the wall structure support, typically a material that is nonconducting such as ceramic, glass, or polymers. Item 704 shows the end view of the heating material typically electrically conductor metal such as copper, nickel, aluminum, or a metal alloy. Item 705 shows a surface where the functional catalyst is supported within the reactor walls.

Inductor Description Wrapped Around Core

Figure 8:
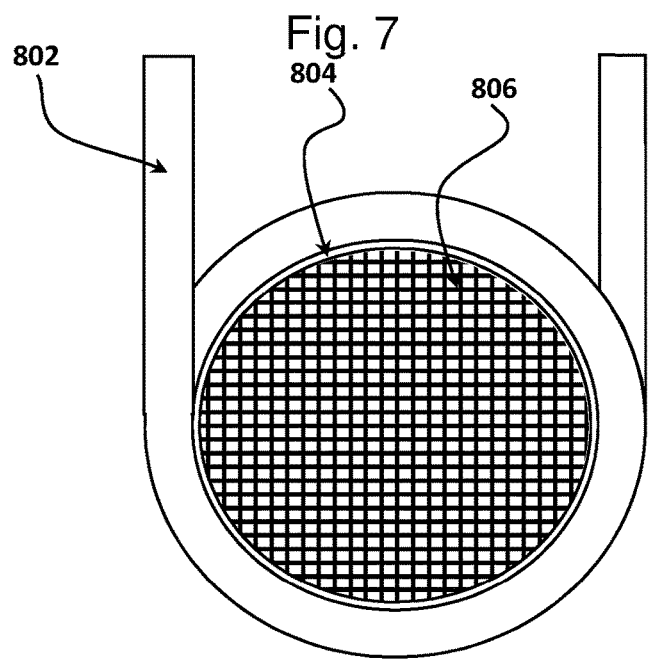
FIG. 8 shows an end view of the finished induction coil wrapped around support structure and showing the channels within the core.

FIG. 8 shows the end view of the finished induction coil 802 wrapped around support structure 804 and showing the channels within the core 806.

Figure 9:
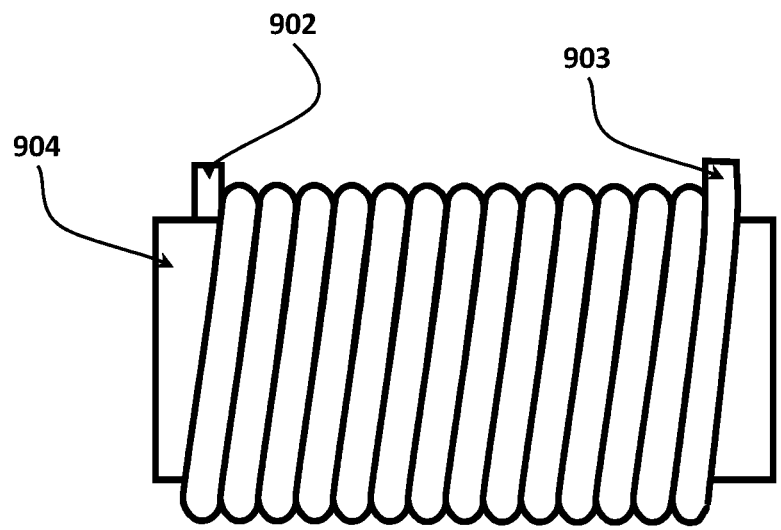
FIG. 9 shows an inductor wrapped around a support structure with the core inside.

FIG. 9 shows the inductor wrapped around a support structure with the core inside. Item 902 is one end of the inductor which is also the cooling liquid entrance, and item 903 is the other end of the inductor and the exit of the cooling liquid. Item 904 is the coil support structure onto which the coil is wound.

Figure 10:
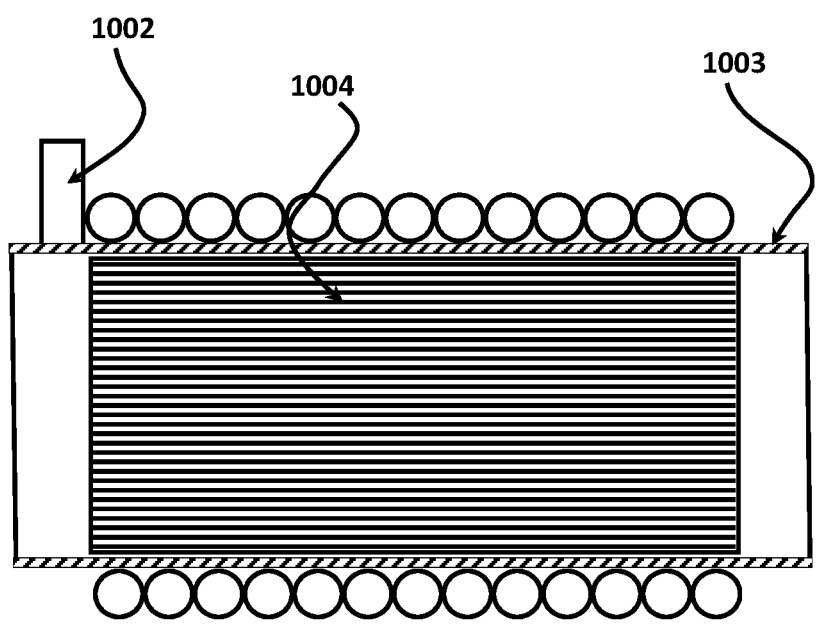
FIG. 10 shows a cut away view of the inductor, wrapped around the inductor support with the core.

FIG. 10 shows a cut away view of the inductor 1002 wrapped around the inductor support 1003 with the core 1004.

Figure 11:
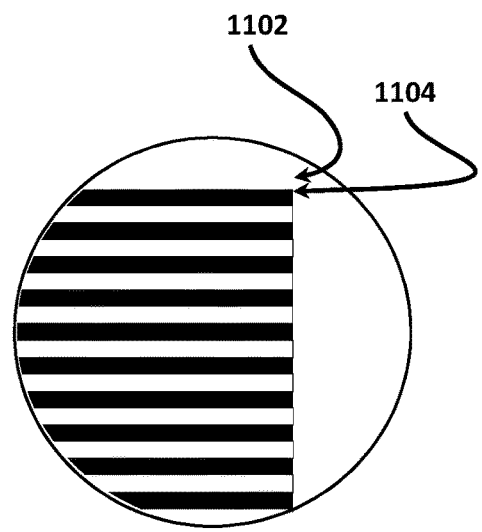
FIG. 11 shows a section of core including the catalyst support and the wall support structures of the core material.

FIG. 11 shows a section of core where 1102 is the catalyst support and 1104 is the wall support structures of the core material.

Figure 12:
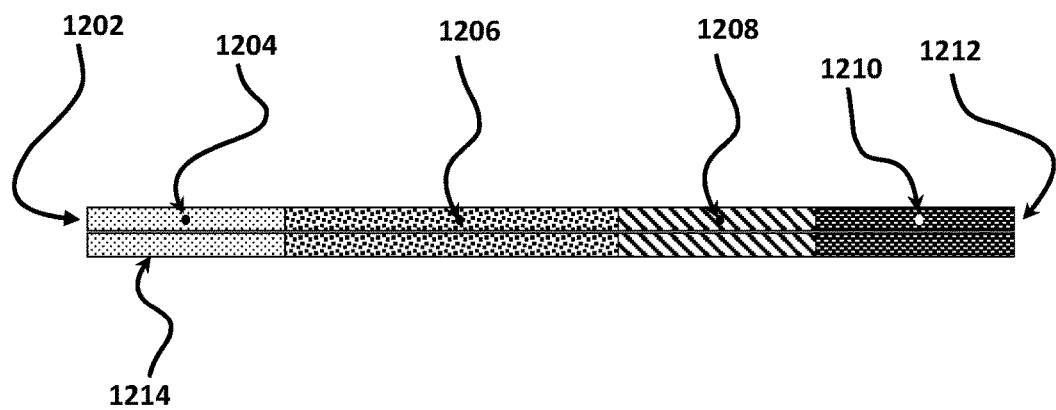
FIG. 12 shows a sample two-channel section of the core, where the channel is designed to have different heating regions.

FIG. 12 shows a sample two-channel section of the core 1214, where the channel is designed to have different heating regions. By applying different metals, 1204, 1206, 1208, and 1210 along the length of the channel, each region heats up differently due to the permeability differences between the different metals. For example this allows for reactant molecules to enter the channel at 1202 and come in contact with the heated catalyst at region 1204 and react. As the molecules move from region 1204 to region 1206, they come into contact with possibly another catalyst at another temperature region until they exit the channel at 1212.

Figure 13:
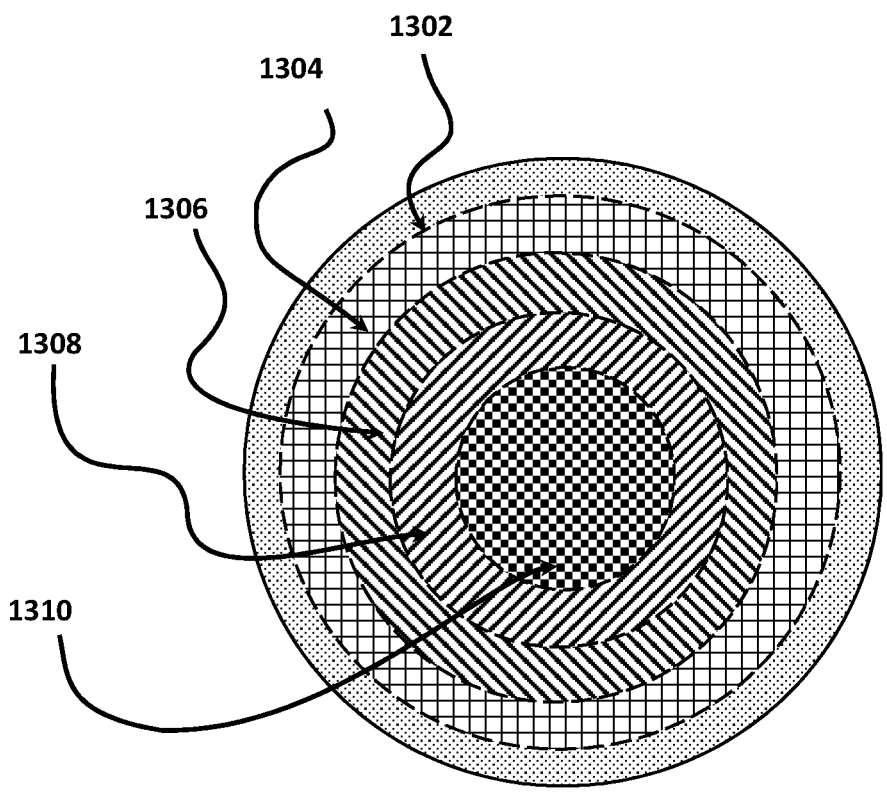
FIG. 13 shows the various potential regions where the metal within the walls of the channels is different so as to be able to provide a more uniform heating from the induction coil.

FIG. 13 shows the various potential regions where the metal within the walls of the channels is different, so as to be able to provide a more uniform heating from the induction coil. Region 1302 might have iron for its heating element whereas region 1304 might have copper, and region 1306 has an alloy. Other regions 1308, 1309 and 1310 may also have different compositions. The different regions can be programmed by changing the magnetic permeability of the materials and the flux density within those regions to provide the necessary eddy currents that will generate heat.

It is noted that the regions may be metamaterials, produced by an additive or subtractive manufacturing process. Thus, each region need not be a homogeneous layer of metal, and may in fact be a patterned heterogeneous material, with variations possible in the patterns, as well as the materials forming the patterns. This opens the possibility of tuned absorption so that particular regions may be specifically addressed according to the frequency of excitation.

Magnetic Description

Figure 14:
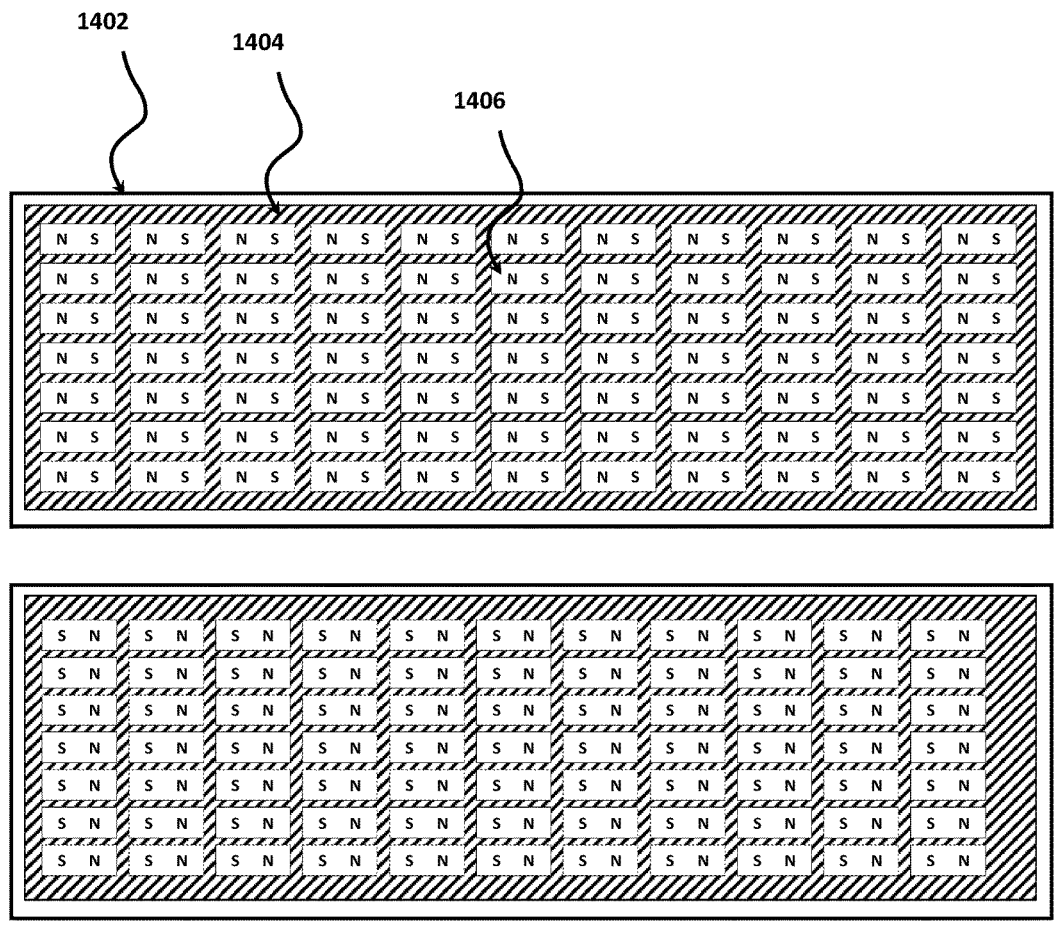
FIG. 14 shows the static state of the dipoles within the metal used for heating.

FIG. 14 shows the static state of the dipoles within the metal used for heating. Item 1402 is the channel wall support structure. Item 1404 is a metal component of the wall used for heating and item 1406 is a typical dipole within the metal bulk.

Figure 15:
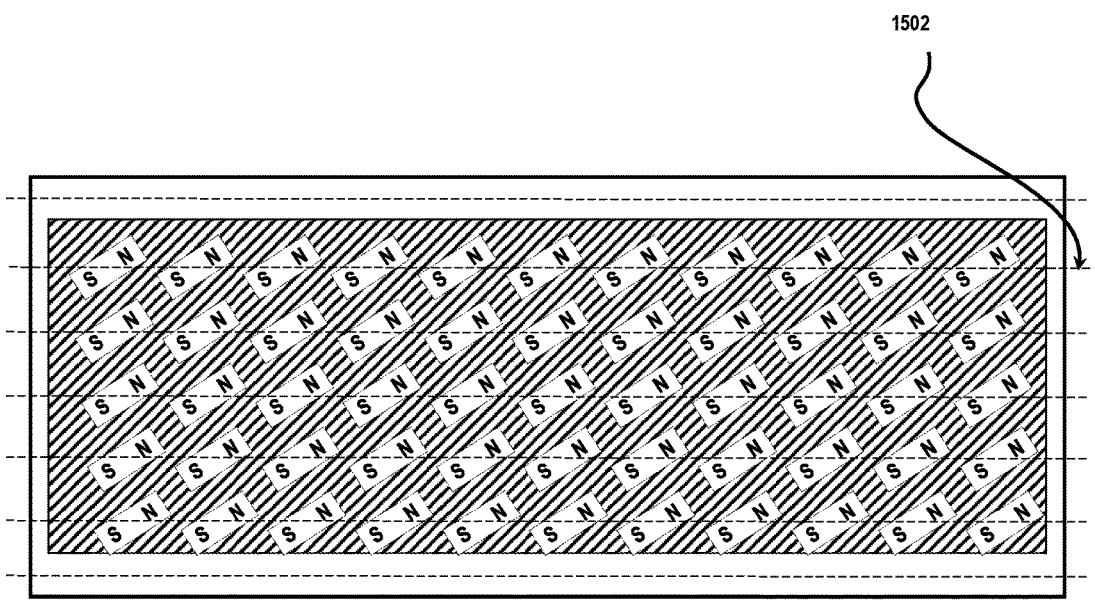
FIG. 15 shows the magnetic flux lines, changing direction, i.e. going from north to south causing the dipoles to rotate.

FIG. 15 shows the magnetic flux lines 1502, changing direction, i.e. going from north to south, causing the dipoles to rotate. By changing the magnetic field polarity from north to south and back again at a high enough rate, causes the dipoles to create friction and thus heat.

Using the Skin Effect and Depth of Penetration for Control

Figure 16:
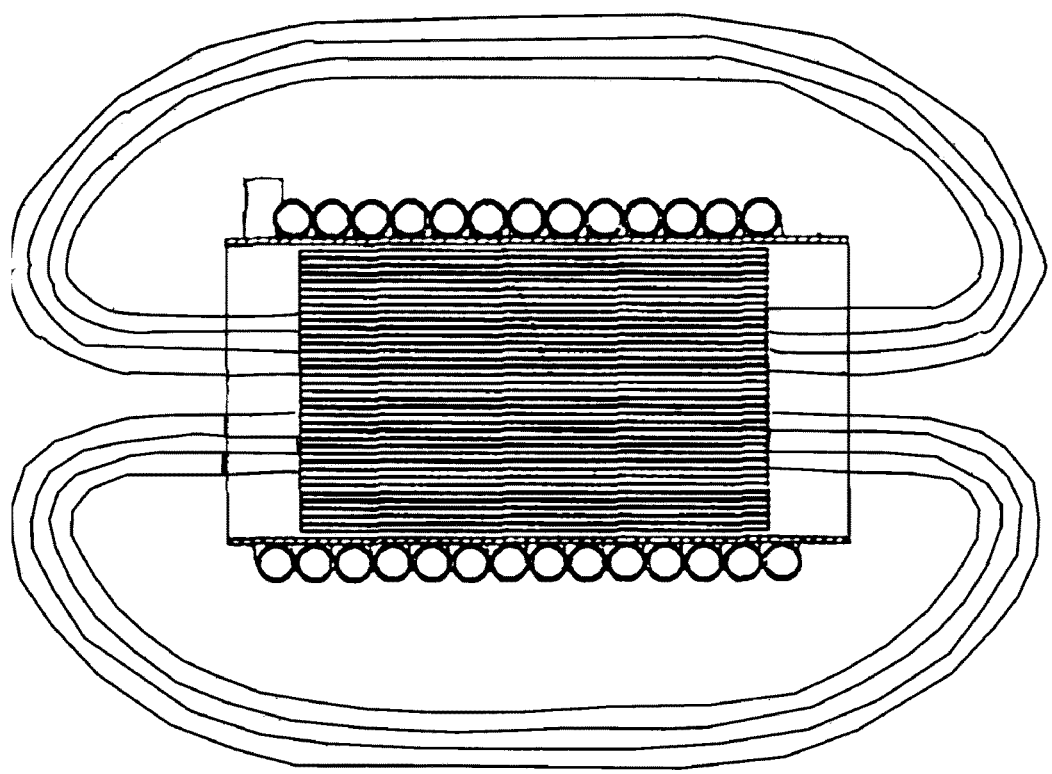
FIG. 16 shows a reactor and magnetic flux lines.
Figure 17:
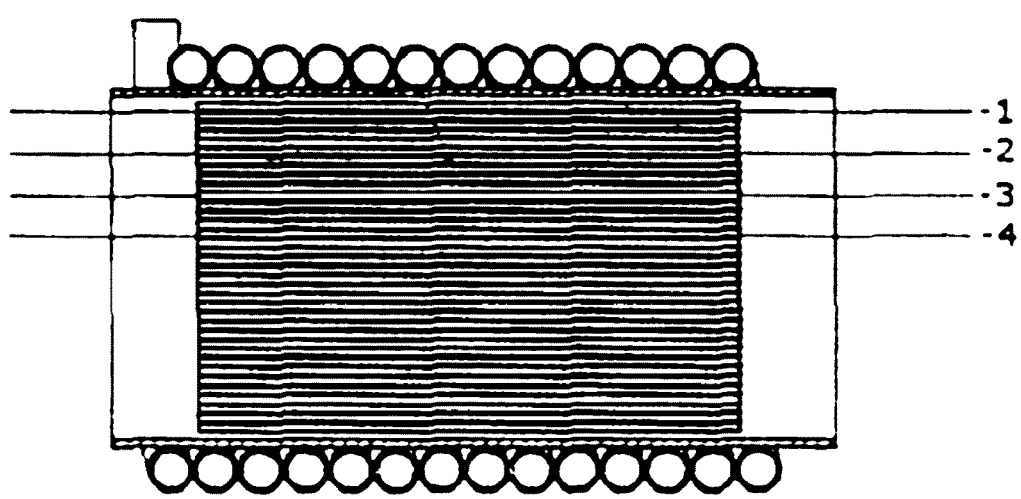
FIG. 17 shows the penetration depth at various frequencies needed to heat the outer channels versus the inner most channels.

FIG. 16 shows reactor and magnetic flux lines, and shows the penetration depth at various frequencies needed to heat the outer channels versus the inner most channels. Example calculations show that for a depth of 10 mm (−4), or roughly ½ the diameter of the core using nickel for the heater metal, the frequency needs to be 60 Hz for a channel length of 38 mm and a core diameter of 25.4 mm with 400 watts of generator power. For the outer most channels (−1), the frequency needs to be 2 kHz for a penetration depth of 1.8 mm and the same drive power again using nickel. The outer channels may have iron in the walls, whereas the channels closer to the inside have copper as the heater metal. So, some channels might have copper, nickel, and iron all embedded within the walls as heaters for a single core.

By sweeping the frequency from 60 hertz to 2 kilohertz, all channels maybe evenly heated to the optimal temperature of 145 degrees Celsius with only 400 watts of power. Examples frequencies are in Table 1, below. Sweeping can also be described as a change of frequency, then holding for a period of time, then moving on to another frequency, then holding again, and then repeating until all channels are heated evenly. So basically the skin effect and the eddy currents are moved deeper within the core by changing the drive frequency.

TABLE 1

Penetration depths of candidate materials

|  | Steel 20° C. | Steel 20° C. | Copper 20° C. | Iron 20° C. | Graphite 20° C. | Nickel 20° C. |
| --- | --- | --- | --- | --- | --- | --- |
| δ in [mm] | 0.16 | 0.16 | 0.01724 | 0.0971 | 10 | 0.0685 |
| ρ [μΩ · m] | 40 | 100 | 1 | 5000 | 1 | 100 |
| Frequency |  |  |  |  |  |  |
| 50 Hz | 4.50 | 2.85 | 9.345 | 0.3136 | 225.08 | 1.86 |
| 100 Hz | 3.18 | 2.01 | 6.608 | 0.2218 | 159.15 | 1.31 |
| 1 kHz | 1.01 | 0.64 | 2.0897 | 0.0701 | 50.33 | 0.4165 |
| 10 kHz | 0.32 | 0.20 | 0.6608 | 0.0222 | 15.92 | 0.1317 |
| 100 kHz | 0.10 | 0.06 | 0.2089 | 0.007 | 5.03 | 0.04165 |
| 1 MHz | 0.03 | 0.02 | 0.0660 | 0.0022 | 1.59 | 0.01317 |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those of ordinary skill in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those of ordinary skill in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of", when used in the claims, have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A chemical reactor comprising a plurality of channels through a core, having a plurality of regions having respectively different frequency-dependent inductive coupling characteristics to an externally applied oscillating magnetic field.

2. The chemical reactor according to claim 1, wherein the core comprises a conductive metal having a heterogeneous composition as a function of position.

3. The chemical reactor according to claim 2, wherein at least one first portion of the core comprises at least one region which is subject to Joule heating but not hysteresis heating, and at least one second portion which is subject to hysteresis heating.

4. The chemical reactor according to claim 1, comprising at least one conductive loop having a resonant coupling frequency.

5. The chemical reactor according to claim 1, wherein the core comprises steel.

6. The chemical reactor according to claim 1, wherein the core comprises copper.

7. The chemical reactor according to claim 1, wherein the core comprises at least one first region comprising principally steel and at least one second region comprising principally copper.

8. The chemical reactor according to claim 1, in combination with an inductive coil, configured to inductively heat the core by generating the oscillating magnetic field when excited by a corresponding electrical signal.

9. The chemical reactor according to claim 8, in combination with a controller configured to generate the corresponding electrical signal, having at least two different frequencies of emission representing at least two corresponding regions of the core.

10. The chemical reactor according to claim 8, in combination with a controller configured to generate the corresponding electrical signal, comprising a direct sequence spread spectrum signal concurrently representing a plurality of frequencies of emission for controlling separately controlled a temperature of the plurality of regions of the core.

11. The chemical reactor according to claim 1, further comprising a catalytic coating on a surface of the plurality of channels.

12. The chemical reactor according to claim 1, further comprising a coating of the surface of the plurality of channels comprising catalytic nanoparticles in a metal oxide carrier.

13. The chemical reactor according to claim 1, further comprising a coating of the surface of the plurality of channels comprising cobalt catalytic nanoparticles in an aluminum oxide carrier.

14. The chemical reactor according to claim 1, comprising a first region which is subject to hysteresis heating at a first frequency and a second region which is not subject to hysteresis heating at the first frequency, such that the first region has a higher specific absorption of energy at the first frequency than the second region, wherein the second region is subject to a larger amount of Joule heating at a second frequency than at the first frequency.

15. The chemical reactor according to claim 14, wherein the second region has a higher specific absorption of energy at the second frequency than the first region.

16. The chemical reactor according to claim 1, configured to catalytically dehydrogenate an organic hydrogen carrier at a peak temperature below about 400° C. to produce a dehydrogenated organic carrier and hydrogen, substantially without degradation of the dehydrogenated organic carrier within the plurality of channels.

17. The chemical reactor according to claim 1, in combination with a hydrogen fuel cell.

18. The chemical reactor according to claim 1, wherein the plurality of regions having respectively different inductive coupling characteristics have inductive coupling characteristics that vary as a function of both depth within the core and distance along the channel.

19. A method of operating a chemical reactor, comprising a plurality of channels through a core, having a plurality of regions having respectively different frequency-dependent inductive coupling characteristics to an externally applied oscillating magnetic field, the method comprising:
- exciting an oscillating magnetic field comprising a plurality of different frequencies, surrounding the core; and
- passing at least one chemical reactant through the plurality of channels.

20. A chemical reactor, comprising:
- a core, having a plurality of reactant flow channels, the plurality of flow channels having a plurality of regions having respectively different frequency-dependent inductive coupling characteristics to an externally applied oscillating magnetic field;
- a controller, configured to generate an oscillating electrical signal having a controllable frequency having a range of at least 2:1; and
- a coil, receiving the oscillating electrical signal and generating the externally applied oscillating magnetic field.

* * * * *